Patented Feb. 15, 1927.

1,617,533

UNITED STATES PATENT OFFICE.

PAUL MAHLER, OF NEW YORK, N. Y., ASSIGNOR TO DARCO SALES CORPORATION, OF NEW YORK, N. Y., A CORPORATION OF DELAWARE.

PROCESS OF REACTIVATING PURIFYING AGENTS.

No Drawing.   Application filed April 15, 1926. Serial No. 102,308.

My present invention relates to processes for reactivating or revivifying decolorizing or purifying agents, such as are commonly used in the arts, for removing color, odor and objectionable impurities from various solutions or liquids.

The invention is more especially useful in the treatment of spent activated carbons, whether used with or without filter aids.

A common process of revivification of spent activated carbon is similar to the general methods of their manufacture, namely, subjecting to intense heat followed by treatment with an acid and washing to free the excess acid.

It is an object of my invention to revivify the decolorizing agent without acid or intense heating and by a simple procedure requiring little time and no specialized apparatus or equipment and no particular skill of treatment, the resultant revivified product being of substantially the same order of efficiency as that heretofore revivified by the more elaborate acid and intense heating process.

My process consists in treating with a gas, the partially or wholly spent decolorizing or purifying agent removed from the treated liquor, preferably until the mass will take up no more of the gas. Preferably, the gas is passed into a fluid mass of the purifying agent, until bubbles pass up from the surface of the mass. This completes the revivifying process and the wet mass may be re-used for its intended purpose as a decolorizing or purifying agent or, if desired, it may be previously dried.

I have found that chlorine gas is highly efficient for the purpose in hand. With the use of less than 5 percent by weight of chlorine compared to the weight of purifying agent, the revivifying process is completed. I do not wish, however, to be confined to the use of chlorine, as I have found other common gases, such as sulphur dioxide to have a practical degree of efficiency for my purpose.

In a preferred specific mode of carrying out the process, the gas treatment is applied to a spent or partially spent activated carbon in a state of creamy consistency. Either sufficient liquid is decanted from the decolorizing vat to leave a residue of the consistency noted, or where the decolorizing agent is passed into a filter press, the caked mass thereof is rendered fluid by the addition of sufficient liquid. The fluid mass is passed into a vat and chlorine gas of the usual commercial degree of purity from an ordinary gas container, is led into the mass by an appropriate pipe or conduit. In carrying out my revivifying process, the vat contents may be exposed freely to the atmosphere in a room and need not be heated or cooled after removal from the decolorizing vats. The gas is thus passed into the mass under ordinary conditions of temperature and pressure. The chlorine gas being shut off as soon as bubbles appear at the surface of the creamy mass, at which time the revivifying process is complete, no special precautions are needed for the protection of the workers, very little of the gas passing into the atmosphere.

While in many cases, the gas may be passed directly into the spent mass without other treatment, it may be desirable to pre-wash it, particularly where colloidal or other impurities are present, which might react with the gas, with which the material is being treated.

I have found that the use of my process renders possible the revivification of the mass several times before it becomes thoroughly spent and inert.

While the invention has its preferred application in the treatment of decolorizing or purifying activated carbons, it is not limited to such use, but may be applied to similar treatment of other absorbent carbons, as well as to decolorizing or purifying agents of other types.

Having thus described my invention, what I claim as new and desire to secure by Letters-Patent of the United States is:—

1. The process of revivifying an absorbent which has been used on aqueous solutions, which consists in subjecting the same to chlorine gas at a temperature below 100° C.

2. The process of revivifying a decolorizing carbon which has been used on aqueous solutions, which consists in passing chlorine gas thereinto at a temperature below 100° C.

3. The process of revivifying a solid decolorizing purifying agent, which consists in passing into a wet mass of said agent after previous use thereof, chlorine gas under atmospheric temperature and pressure, until bubbles of said gas are given off, 4. The process of revivifying a decolorizing carbon, which consists in passing into a wet mass of said agent after previous use thereof, chlorine gas under atmospheric temperature and pressure until bubbles of said gas are passed off.

5. The process of revivifying a decolorizing agent, which consists in depositing in a vat a mass of said agent after previous use thereof, with sufficient liquid to be of a creamy consistency and leading chlorine from an ordinary gas container into the mass until bubbles of gas begin to be given off.

6. The process of revivifying a decolorizing activated carbon, which consists in removing the spent carbon from the decolorizing vat, rendering the same of a creamy consistency, placing the same in a revivifying vat and leading thereinto commercial chlorine gas under atmospheric pressure and temperature until bubbles of said gas begin to pass off.

Signed at New York, in the county of New York and State of New York, this 14th day of April, A. D. 1926.

PAUL MAHLER.